(12) United States Patent  (10) Patent No.: US 6,965,364 B1
Eggers et al.  (45) Date of Patent: Nov. 15, 2005

(54) DEVICE AND METHOD FOR COMPENSATING NON-UNIFORMITIES IN IMAGING SYSTEMS

(75) Inventors: Stefan Eggers, Wentorf (DE); Claas Andreae, Brietlingen (DE)

(73) Assignees: Basys Print GmbH Systeme fuer die Drueckindustrie, Boizenburg (DE); Toyo Ink. Mfg. Co. Ltd., Tokyo (JP)

( * ) Notice: Subject to any disclaimer, the term of this patent is extended or adjusted under 35 U.S.C. 154(b) by 355 days.

(21) Appl. No.: 10/070,709

(22) PCT Filed: Aug. 11, 2000

(86) PCT No.: PCT/EP00/07842

§ 371 (c)(1),
(2), (4) Date: Mar. 12, 2002

(87) PCT Pub. No.: WO01/21413

PCT Pub. Date: Mar. 29, 2001

(30) Foreign Application Priority Data

Sep. 17, 1999 (DE) ................................. 199 44 760

(51) Int. Cl.[7] .............................. G09G 3/34; G09G 5/00
(52) U.S. Cl. .................. 345/84; 345/6; 345/7; 347/239
(58) Field of Search ............................ 345/84, 87, 6–9; 347/239, 255, 244, 241

(56) References Cited

U.S. PATENT DOCUMENTS

| 5,049,901 | A | * | 9/1991 | Gelbart ....................... 347/239 |
| 5,247,180 | A | * | 9/1993 | Mitcham et al. ......... 250/492.1 |
| 5,672,464 | A | | 9/1997 | Nelson |
| 6,072,518 | A | * | 6/2000 | Gelbart ....................... 347/239 |
| 6,208,369 | B1 | * | 3/2001 | Oren et al. ................. 347/244 |
| 6,504,567 | B1 | * | 1/2003 | Pagan ......................... 347/255 |

FOREIGN PATENT DOCUMENTS

DE   41 21 509 A1   1/1992

* cited by examiner

*Primary Examiner*—Amr A. Awad
(74) *Attorney, Agent, or Firm*—Michael J. Striker

(57) ABSTRACT

An illumination and modulation device is described, as well as a method for modulating the exposure intensity in the integrating digital screen imaging system (IDSI), comprising a light source, a light modulator, and various devices. The object of the invention is to present a device and a method with which the exposure quality can be optimized using simple means. The object on which the invention is based is attained by the fact that the device comprises at least one device for varying the number of cells of the light modulator used to expose the photosensitive material or by the fact that, in the method according to the invention, the number of cells of the light modulator used to expose the photosensitive material can be varied.

8 Claims, 3 Drawing Sheets

DEVICE AND METHOD FOR COMPENSATING NON-UNIFORMITIES IN IMAGING SYSTEMS

BACKGROUND OF THE INVENTION

The invention concerns an exposure and modulation device for modulating the exposure intensity in the integrating digital screen imaging system (IDSI) comprising a light source and a light modulator that has a plurality of rows of light-modulating cells, and comprising a device for imaging on the light modulator, a device for imaging the light modulator onto photosensitive material, and a device for producing a relative motion between the light modulator and the photosensitive material, whereby the direction of motion is basically perpendicular to the direction of the rows of light-modulating cells, and comprising a device for scrolling a data pattern through the various columns of the light modulator at a speed by means of which the imaging of any data pattern is kept basically stationary relative to the photosensitive material during the motion.

The invention further concerns a method for exposing and modulating the exposure intensity in the integrating digital screen imaging system (IDSI), in which light from a light source is imaged on a light modulator that comprises a plurality of rows of light-modulating cells, and is modulated by this, after which the light modulator is imaged onto photosensitive material moving in a motion relative to the light modulator, whereby the direction of motion is basically perpendicular to the direction of the rows of light-modulating cells, and that the data to be imaged on the photosensitive material are scrolled through the columns of the light modulator at a speed by means of which the imaging of any data pattern is kept basically stationary relative to the photosensitive material during the motion.

The device described hereinabove was made known in DE 41 21 509 A1. The invention described in this document is particularly significant for processes in which large quantities of modulated light are required in the blue and ultraviolet range, such as in the exposure of printing plates, the exposure of printed circuits, and in stereolithography. According to the principle of the invention, the photosensitive material is moved continuously while the image contents are scrolled in the opposite direction at the same speed by the light modulator. The image contents therefore remain in one location on the material to be exposed. The exposure takes place by integrating all short, individual exposures of the cells in a row. Strips having a width corresponding to the number of rows of the light modulator are therefore exposed. A larger area is exposed by placing a plurality of strips next to each other.

The problem with the device described is that non-uniformities in the light modulator, e.g., caused by differences in illumination or imaging power differing at the local level when cells are controlled in uniform fashion, produce different exposure results within a partial image on the material to be exposed. As a rule, the differences between adjacent pixels on the photosensitive material cannot be detected by the human eye, because humans primarily see differences. Compensation is very problematic in areas, in particular, where non-adjacent pixels are projected next to each other on the photosensitive material. In the IDSI system, this affects the outer rows, because the exposed strips meet overlap there.

In contrast to the IDSI system, individual image sections are exposed using the digital screen imaging (DSI) system. The entire image is then composed of a plurality of individual images. Attempts to transfer the system for compensating non-uniformities used in the DSI system to adjust the energy in each cell separately were not successful. On the one hand, the necessary transmission rates at a maximum scrolling frequency of approximately 50 kHz and a necessary gradation depth of a minimum of 6 bits—with 8 bits even better—and a light modulator width of 1024 cells far exceed the capabilities of control electronics. On the other hand, a light modulator does not exist that would operate quickly enough to guarantee a gradation of 6 to 8 bits at a cadence of 50 kHz.

SUMMARY OF THE INVENTION

The object of the invention, therefore, is to present a device and a method with which the exposure quality can be optimized using simple means.

The object on which the invention is based is attained by the fact that the device comprises at least one device for varying the number of cells of the light modulator used to expose the photosensitive material, or that, with the method according to the invention, the number of cells of the light modulator used to expose the photosensitive material can be varied.

The entire length of the image information is not scrolled through the light modulator. Instead, the scrolling process is stopped after a certain, adjustable number of cells. The exposure time can therefore be varied for every pixel in the row on the photosensitive material to be exposed. The integrated energy of a row can be defined exactly. The non-uniformities can thereby be compensated using a simple means of control.

The great advantage of the device according to the invention over DSI devices is that the number of cells to be calibrated can be reduced from many hundreds of thousands of cells to approximately one thousand rows.

According to a further advantageous exemplary embodiment of the invention, the light modulator comprises a digital mirror device (DMD). The individual mirrors of the digital mirror device can be controlled well without serious problems. The mirrors that are not used by the device according to the invention to expose the photosensitive material direct the light beam imaged on it away from the photosensitive material.

According to an advantageous exemplary embodiment of the invention, the light modulator comprises 1024*758 cells. This allows the gradation of the exposure energy to take place with a great level of detail. The adjustment can take place in 758 units or 1024 units, depending on the scrolling direction of the data pattern by the light modulator.

According to another very advantageous exemplary embodiment of the invention, it is provided that the light modulator comprises a liquid-crystal array, magneto-optical cells, or ferroelectric cells. In principle, any other variation of light modulators may be used as well. This results in the considerable advantage that every existing IDSI device can be modified with a device for varying the number of cells of the light modulator used to expose the photosensitive material.

As mentioned hereinabove, the object of the method is attained very advantageously by the fact that the number of cells of the light modulator used to expose the photosensitive material is varied. The exposure time can be varied for every pixel on the photosensitive material to be exposed, because the image information is no longer scrolled across the entire length of the light modulator. The integrated energy of a row can be defined very exactly. The non-uniformities can therefore be compensated using a simple means of control.

According to a particularly advantageous exemplary embodiment of the method according to the invention, it is not necessary to first transfer the image data to the first column of the light modulator. The data can be transferred first to a column lying further back, for example. The columns located before them are not used for exposure. The exposure energy applied therefore decreases.

This is described in greater detail using the drawings, which represent an exemplary embodiment of the invention.

DESCRIPTION OF THE PREFERRED EMBODIMENTS

Figure 1:
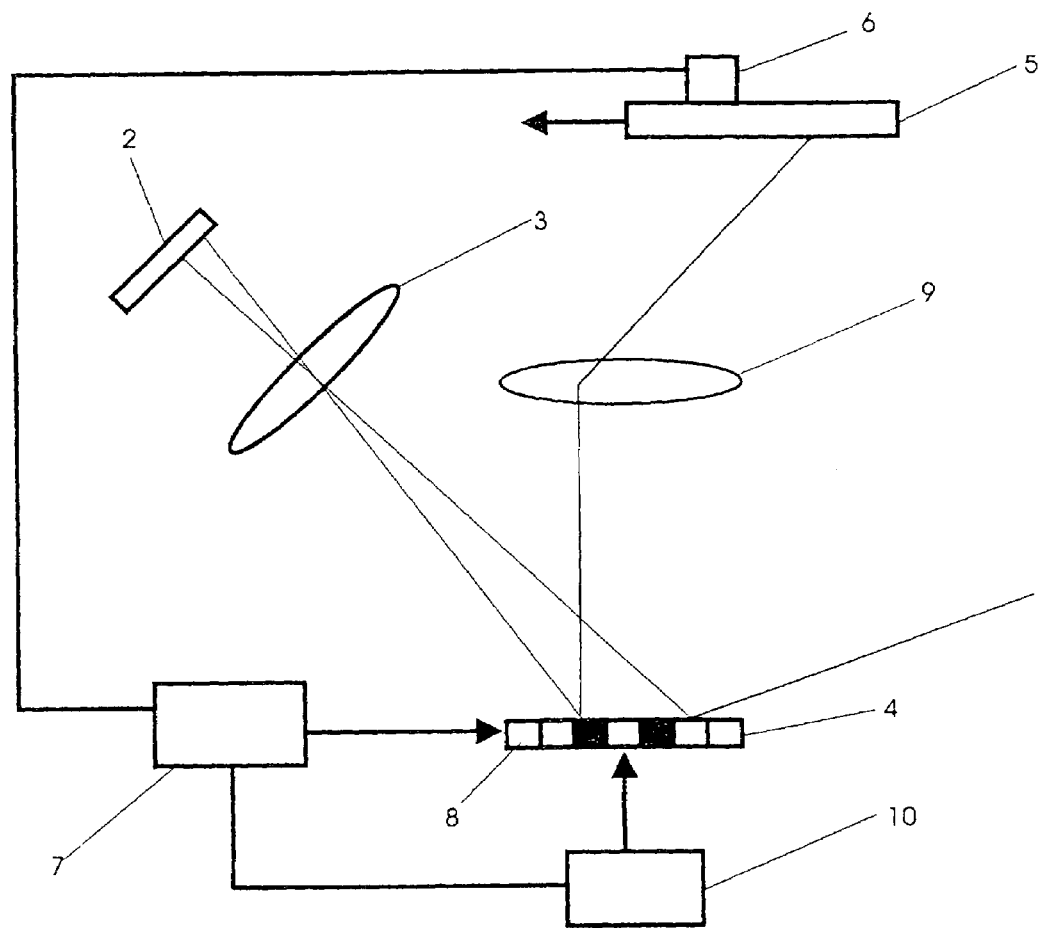
FIG. 1 shows a schematic drawing of the entire exposure and modulation device.

FIG. 1 is a schematic drawing of the exposure and modulation device 1: a light source 2 is imaged on a light modulator 4 using a first lens 3. The position of the photosensitive material 5 relative to the light modulator 4 is changed by a locator 6. The relative motion takes place in the direction of the cells of a row of the light modulator. Data patterns are transferred to the first column with cells 8 of the light modulator using a driver circuit 7. It is important that the transmission of the data pattern be synchronized with the motion of the photosensitive material 5. The data pattern transferred to the first column is moved to the next column in synchronization with the relative motion, so that the data pattern transferred to the photosensitive material 5 remains stationary on it. The light modulator 4 comprises a plurality of columns of cells 8. The data pattern transferred to the light modulator 4 comprises combinations of activated and non-activated cells 8. If the cells 8 are activated, the light falling on them is transferred to the photosensitive material 5 via a second lens 9. The light that hits inactive cells is directed away by the photosensitive material 5. A particularly positive aspect of the exemplary embodiment shown is the fact that a device 10 is provided that varies the number of cells available for exposure. This means that not all the cells 8 in a row are available for transmission of the data pattern. Since the intensity of exposure of the material to be exposed depends on the exposure time, i.e., on the available cells 8, this device 10 makes it possible to compensate non-uniformities in the image.

Figure 2:
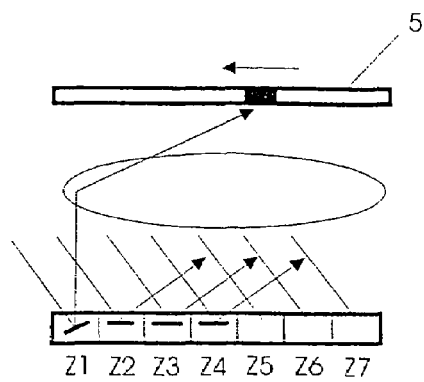
FIGS. 2–5 show a schematic drawing of the principle of data pattern transmission.
Figure 3:
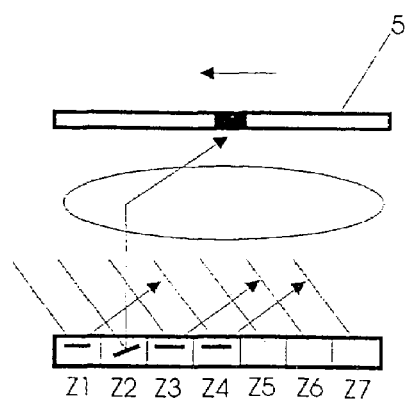
Figure 4:
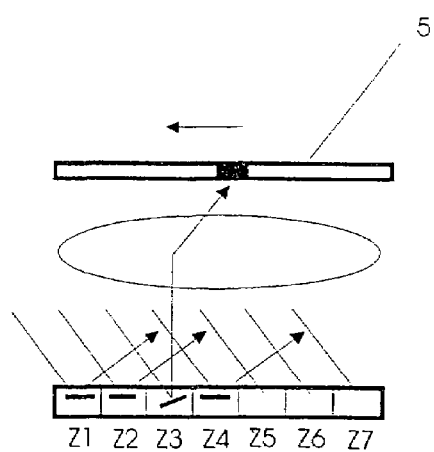
Figure 5:
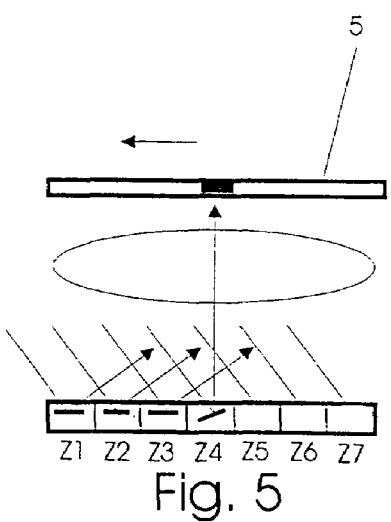

FIGS. 2 through 5 illustrate how a data pattern is moved from cell to cell in a row while remaining stationary on the photosensitive material 5. In FIG. 2, a signal reaches the first cell Z1. In FIG. 3, the same data pattern is transferred to the next column-cell Z2 in this case—while a new pattern is transferred to the first column-cell Z1 in this case. In FIG. 5, the data pattern input first has reached cell 4 (Z4). Cells Z5 through Z6 cannot be controlled by the device 10 for transmission of the data pattern. They are not available for exposing the photosensitive material. If a higher exposure intensity is required, they are activated and the data pattern is transferred further.

Figure 6:
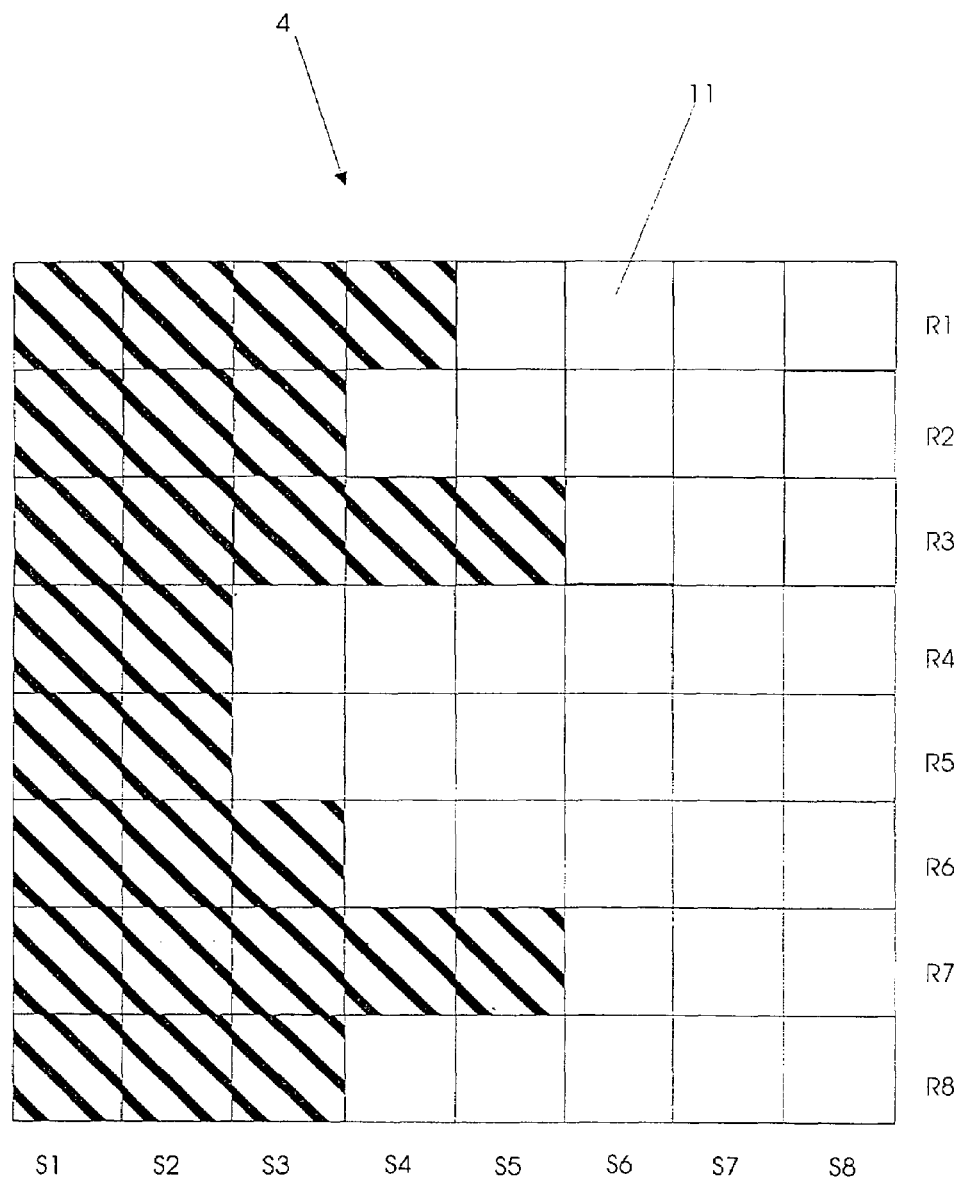
FIG. 6 shows a schematic drawing of the light modulator with cells that are used and not used for the imaging.

FIG. 6 shows a light modulator 4 that is subdivided into rows R1 through R9 and columns S1 through S8. The cells 11 indicated by diagonal lines are available for exposure. Data patterns are input in column 8 and transferred to column S7. A different number of cells 11 can be controlled in the various rows R1 through R8. Since the intensity of exposure is integrated via the cells in a row, this results in different intensities of exposure for individual pixels on the photosensitive medium 5.

What is claimed is:

1. An exposure and modulation device for modulating an exposure intensity in an integrated digital screen-imaging system, comprising a light source; a light modulator that includes a plurality of rows of light-modulating cells; a device for imaging on said light modulator; a device for imaging said light modulator on a photo sensitive material; a device for producing a relative motion between said light modulator and said photo sensitive material, so that a direction of motion is substantially perpendicular to a direction of said rows of said light-modulating cells; a device for scrolling a data pattern through various columns of said light modulator at a speed so that the imaging of any data pattern is kept substantially stationary relative to said photosensitive material during said motion; and at least one device for stopping the scrolling procedure after a certain adjustable number of cells of said light modulator used for exposure of said photosensitive material, wherein said device for stopping the scrolling procedure is capable of stopping the scrolling procedure individually for every pixel in the row, whereby exposure times can be controlled individually for each pixel.

2. An exposure and modulation device as defined in claim 1, wherein said light modulator includes a digital mirror device.

3. An exposure and modulation device as defined in claim 1, wherein said light modulator has 1024*758 cells.

4. An exposure and modulation device as defined in claim 1, wherein said light modulator includes a liquid-crystal array.

5. An exposure and modulation device as defined in claim 1, wherein said light modulator includes magneto-optical cells.

6. An exposure and modulation device as defined in claim 1, wherein said light modulator includes ferroelectric cells.

7. A method for exposure and modulation of exposure intensity in an integrated digital screen imaging system in which light from a light source is imaged on a light modulator that includes a plurality of rows of light-modulating cells, the method comprising the steps of modulating the light from the light source by the light modulator, thereafter imaging the light modulator on a photosensitive material moving in a motion relative to the light modulator; selecting a direction of motion substantially perpendicular to a direction of the rows of the light-modulating cells; scrolling data to be imaged on the photosensitive material through columns of the light modulator at a speed so that the imaging of any data pattern is kept substantially stationary relative to the photosensitive material during the motion; and stopping the scrolling after a certain adjustable number of cells of the light modulator used to expose the photosensitive material, depending on the exposure time specified for a respective pixel on the material to be exposed, said stopping being carried out Individually for every pixel in the row, whereby exposure times can be controlled individually for each pixel.

8. A method as defined in claim 7; and further comprising moving the data to be imaged to any column so that they can be transferred from there to subsequent columns.

* * * * *